United States Patent Office 2,807,455
Patented Sept. 24, 1957

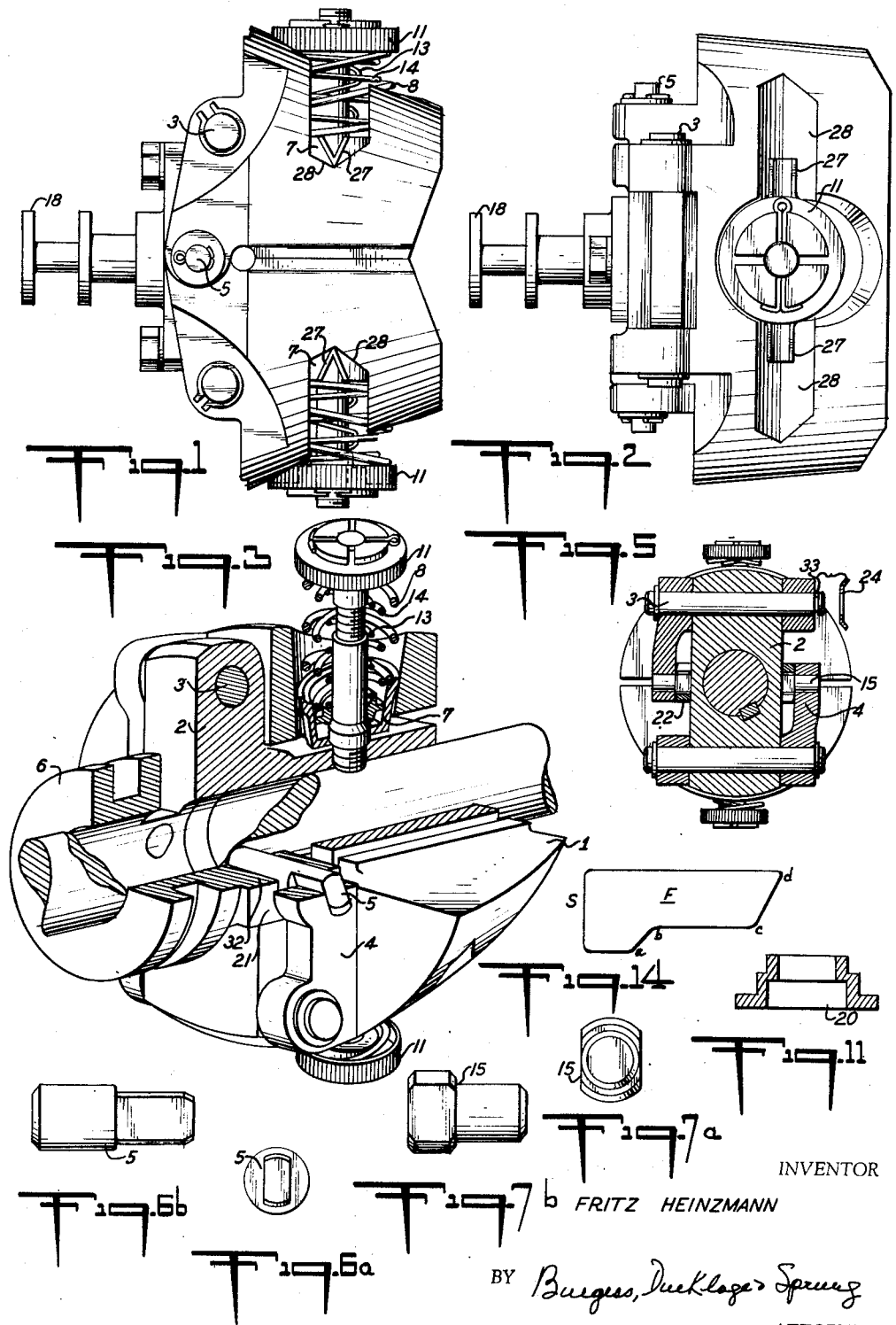

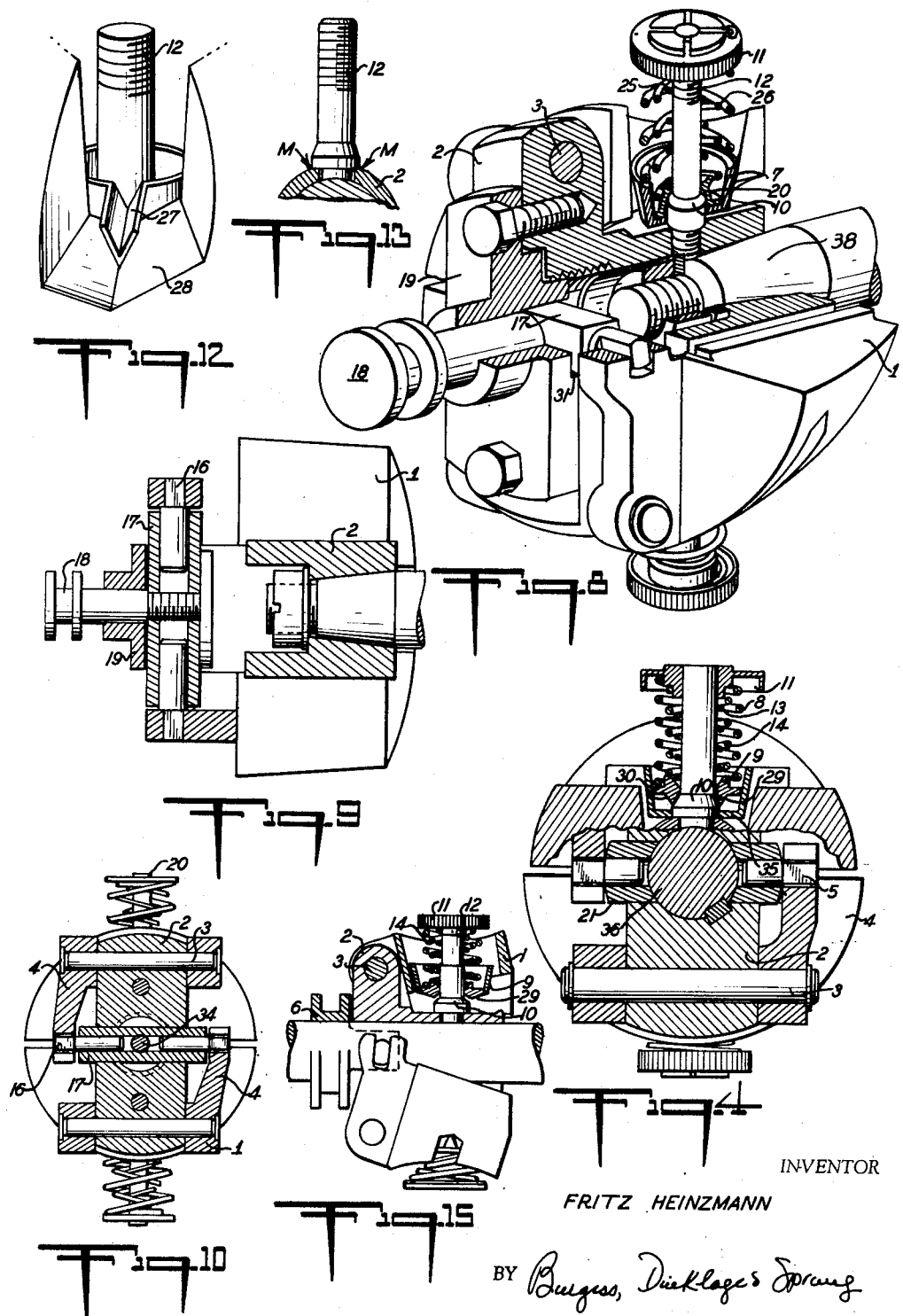

2,807,455
CENTRIFUGAL SPEED GOVERNOR

Fritz Heinzmann, Albershausen, Germany

Application November 15, 1950, Serial No. 195,786

Claims priority, application Germany December 1, 1949

9 Claims. (Cl. 264—15)

This invention relates to improvements in centrifugal speed governors. The invention more particularly relates to a centrifugal speed governor which permits a reduction of friction, an increase in effective governing power, a simplification of construction, and more reliability in operation.

This governor, in accordance with the invention, has flyweights formed as bell crank levers, and is adapted to satisfy all demands which modern governors have to meet. The reduction of friction obtained by the invention makes it possible to use the governor with its weights and integral bell crank levers for the purpose of maximum-minimum speed control as, for example, in an internal combustion engine.

The invention and its objects will become apparent from the following description read in conjunction with the accompanying drawings in which:

Fig. 1 is a side elevational view of the centrifugal governor in accordance with the invention.

Fig. 2 is a top plan view of Fig. 1.

Fig. 3 is a perspective view partly in longitudinal section showing an embodiment of a maximum-minimum centrifugal governor in accordance with the invention fixed to a through shaft.

Fig. 4 is a cross section of the embodiment in Fig. 3.

Fig. 5 is a further cross section of the embodiment in Fig. 3 showing another kind of articulation between weights and sleeve.

Fig. 6a is a plan view of the pivot 5 shown in Fig. 4.

Fig. 6b is a side elevation of the pivot 5 shown in Fig. 4.

Fig. 7a is a plan view of the pivot 15 shown in Fig. 5.

Fig. 7b is a side elevation of the pivot 15 shown in Fig. 5.

Fig. 8 is a perspective view partially in section showing the centrifugal governor with control pin in its construction as a one speed range governor.

Fig. 9 is a longitudinal section of Fig. 8.

Fig. 10 is a cross section of Fig. 8.

Fig. 11 is a cross section of cap 20 of Fig. 8.

Fig. 12 is a perspective view of the wedge-shaped seats 28 in the weights 1.

Fig. 13 diagrammatically illustrates the manner in which the stay bolts 12 are secured by calking.

Fig. 14 shows a centrifugal force diagram.

Fig. 15 is a side elevation partially in section showing the centrifugal governor of Figs. 3–7, with the weights in their outer position.

Figs. 3–5 show a centrifugal governor secured on a through shaft and constructed as a maximum-minimum governor having fly weights with integrally connected lever arms so that the same are in the form of bell crank levers. The fly weights 1 are pivotally mounted on the governor support 2 by means of pivot joints 3. The lever arms 4 of the weights act by means of pivots 5 on the claws 21 or 22 of sleeve 6 which is connected with the distributing mechanism of a prime mover by means of rods and levers not shown.

The claws of the sleeve 6 are guided in slots on the governor body on support 2 (see Figs. 3 and 4). The link joint connecting the weights and the sleeve is made by the pivots 5 which are movably seated in cylindrical holes 32 in claws 21. The said pivots 5 are separately shown in Figs. 6a and 6b. Fig. 5 shows another link joint connecting weights 1 and sleeve 6. In this case the sleeve claws 22 project over the governor support 2. The pivots 15 are separately shown in Figs. 7a and 7b. The spring supports 7 which are movably seated in the weights 1 by means of wedge shaped journals 27 are carried by the corresponding wedge seats 28 of the weights 1. During minimum lift $a$—$b$, as shown in the force diagram of Fig. 14, only the outer springs 8 exert pressure on the movably seated spring supports 7. During maximum lift $c$—$d$ the movably seated spring supports 7 will additionally move the inner spring supports 9 against which the inner springs 13 and 14 are pressing, so that during maximum lift $c$—$d$ the governor works with all three pairs of springs 8, 13 and 14. During minimum lift the spring supports 9 are in contact with the collar 10 of bolts 12 by means of their inner cone 29. During maximum lift $c$—$d$ the spring supports 9 are taken off from collar 10 of bolts 12 and carried away by the movably seated spring supports 7 by means of the outer cone 30. The nuts 11 are screwed to the bolts 12 against which the springs 8, 13 and 14 press. In operation the friction of the control governor is reduced to a minimum, since the movably seated spring supports 7 have wedged-shaped journals 27 seated in wedge seats 28 of the weights 1.

Figs. 8, 9 and 10 show the centrifugal governor fixed to a conically tapered end 38 of a shaft. With their arms 4 and by means of pivots 16 the weights 1 act on the transverse piece 17 which is guided in a slot 31 of the guiding piece 19 which in turn is fixed to the governor support 2. The transverse piece 17 is firmly screwed in contact with control pin 18. The other elements have the same functions as described with the governor shown by Figs. 3–7a and 7b.

The present invention in its application for maximum-minimum governors provides inner spring supports 9 which are in contact with the collar 10 of bolts 12 by means of an inner cone 29 of the spring supports 9 and which are moved by the movably seated spring supports 7 by means of an outer cone 30 of spring supports 9 and a corresponding countersunk cone 35 of spring supports 7. This arrangement leaves the spring supports 9 fully free to oscillate without any friction, whereby diminution of friction and increase of effective governing power of the centrifugal governor are obtained.

According to the present invention, it is possible to transform maximum-minimum speed governors manufactured in series production without any change of design, into one speed range governors. This is effected by putting into the spring supports 7, caps 20 (see Fig. 8) which embrace the collar 10 of the bolts 12. These caps 20 are separately shown in Fig. 11. The inner springs 25 and 26 will exert pressure on these caps and are centered by the same.

Fig. 5 shows a simple securing arrangement which is suitable for fixing the pivots 3 as well as the spring nuts 11 (as shown in Figs. 4 and 8). This arrangement provides taper pressed rings 24. The grooves 33 are turned in at the end of the pivots 3, the inside diameter of these grooves 34 being related to the inside diameter of the tapered ring 24 in such a manner that the tapered ring snaps into the groove 33 as soon as it is flattened after having been drawn over the outer collar.

Such an arrangement insures the greatest rigidity and will permit increased reliability in operation.

When the centrifugal governor is fitted to a through shaft, the sleeve 6 will require a certain length of bearing, which length will involve an additional length of governor. According to the present invention, the additional guiding of the sleeve 6 is obtained by the sleeve claws 21 (see Fig. 4), which are guided with two parallel faces in corresponding slots of the governor support 2. At their inner portions these sleeve claws 21 are cylindrically ground. By means of this cylinder grinding as shown by the cylindrical rounding 36, they are guided directly on the shaft. Thus an additional guiding of the governor sleeve is obtained in the simplest way. With normal tools it is possible to grind the side faces and the inside cylindrical rounding of the sleeve claws with the utmost precision, and in this manner the precision of operation of the governor is obtained.

According to the present invention, weights 1 and sleeve 6 are pivotally connected by means of cylindrical pivots 5 or 15 flattened at one end by two faces parallel to one another. In this way it is not necessary that any other securing elements be employed. According to Figs. 3, 4, and 6a and 6b, the cylindrical ends of the pivots 5 are pivotally inserted in the claws 21 of the sleeve 6 and their flattened ends are slidingly fitted into slots of the weight arms 4.

The Figs. 5, and 7a and 7b show another embodiment of said construction. The cylindrical ends of the pivots 15 are seated in the weight arms 4, and their flattened end engages with slots of the sleeve claws 22 which, in this case, slide on the governor support 2. In both cases during operation centrifugal force will press the pivots 5 and 15, by means of the shoulder between the flattened and the cylindrical parts, against the arms 4, so that the pivots cannot fall out.

Figs. 8, 9 and 10 show a centrifugal governor fixed to the end of a shaft by means of the control pin 18. According to the present invention, the pivotal connection of the weights and the control pin is obtained by a transverse piece 17, which is guided with two parallel faces in rectangular slots of the guiding piece 19. The transverse piece 17 has two cylindrical holes 34, in which the pivots 16 are pivotally mounted. The pivots 16 are flattened at one end having two faces parallel to one another, with which they are in contact with rectangular slots of the arms 4 of weights 1. The transverse piece 17 is firmly screwed up to the control pin 18. Due to this construction, all articulations are in surface contact, so that reliability in operation and precision of governing is increased.

According to the present invention, the bolts 12 are secured, without soldering, brazing or welding, by calking the governor support 2 to the screw thread of bolt 12, in the direction of arrow M as for example (Fig. 13), by means of a ring shaped calking chisel or other suitable tool, whereby quick machining is possible.

I claim:

1. A centrifugal speed governor comprising a rotatable governor body, a pair of opposed flyweights having integrally connected lever arms forming bell crank levers, pivotally connected to said governor body for pivoting outwardly due to centrifugal force upon rotation of said governor body, each of said flyweights having an opening therethrough extending in a direction substantially normal to the axis of rotation of the governor body, each of said flyweights having a knife-edge support adjacent said opening, a pair of opposed stay bolts connected to said governor body extending through said opening substantially normal to the axis of rotation of the governor body, spring holding means connected to the end portion of each of said stay bolts, spring supporting means comprising a spring retaining cup surrounding each stay bolt and two opposed wedge-shaped projections extending from said cup defining a knife-edge in pivotal contact with said knife-edge support, a pair of springs surrounding said stay bolts between said spring supporting means and said spring holding means for compression upon outward pivoting of said flyweights, and a control member connected to said lever arms for axial movement upon pivoting of said flyweights.

2. Governor according to claim 1 in which said knife-edge supports are defined by wedge-shaped troughs extending on each side of the openings defined through said flyweights substantially parallel to the axis of pivot thereof, said wedge-shaped projections having more acute wedge angles than said wedge-shaped troughs to allow a limited pivoting of said projections in said troughs.

3. Governor according to claim 2 in which each said spring has in spring supporting engagement with the inner end thereof an annular spring support positioned in said spring-retaining cup for limited universal tilting with respect thereto.

4. Governor according to claim 3 including a separate second spring surrounding each of said first mentioned springs and biased between said spring holding means and said annular spring-retaining cup.

5. Governor according to claim 4 including a projection defined on each of said stay bolts adjacent to said governor body and dimensioned for supporting contact with said spring support when said flyweights are positioned adjacent to said governor body.

6. Governor according to claim 5 including a third spring surrounding each of said stay bolts positioned within said first mentioned springs biased between said spring supports and said spring holding means.

7. Governor according to claim 6 in which said stay bolts are threaded stay bolts and in which said spring holding means include threaded nuts screwed on to the free end of said stay bolts, and in which said governor body has an axial bore and in which said control member includes a control rod axially movable within said bore and pivotally connected to the end of said lever arm.

8. Governor according to claim 1, in which said control member comprises a control sleeve co-axially positioned with the axis of rotation of the governor, guided for axial movement in slots defined in said governor body and pivotally connected to said lever arms for axial movement upon pivoting of said fly weights.

9. Governor according to claim 1, in which each of said stay bolts defines a conically-shaped collar adjacent said governor body and in which each said spring has in spring-supporting engagement with the inner end thereof an annular spring support defining an inner conically-shaped seat for supporting engagement with said conically-shaped collar, and including a separate second spring surrounding each of said first-mentioned springs and biased between said spring-holding means and said spring-retaining cup.

References Cited in the file of this patent

UNITED STATES PATENTS

| | | |
|---|---|---|
| 409,093 | Agee | Aug. 13, 1889 |
| 734,475 | Sheriff | July 21, 1903 |
| 900,852 | Hodgkinson | Oct. 13, 1908 |
| 1,928,476 | Baur et al. | Sept. 26, 1933 |
| 1,971,070 | Heinzmann | Aug. 21, 1934 |

FOREIGN PATENTS

| | | |
|---|---|---|
| 393,816 | Great Britain | June 5, 1933 |
| 481,271 | Great Britain | Mar. 8, 1938 |
| 495,629 | Great Britain | Nov. 16, 1938 |
| 564,627 | Germany | Nov. 21, 1932 |
| 578,177 | Germany | June 10, 1933 |
| 624,353 | Germany | Jan. 18, 1936 |